United States Patent
Pascoguin et al.

(10) Patent No.: US 12,399,263 B2
(45) Date of Patent: Aug. 26, 2025

(54) TARGET JAMMING

(71) Applicant: Naval Information Warfare Center Pacific, San Diego, CA (US)

(72) Inventors: Bienvenido Melvin L. Pascoguin, San Diego, CA (US); Brittany Lynn, San Diego, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 955 days.

(21) Appl. No.: 17/526,406

(22) Filed: Nov. 15, 2021

(65) Prior Publication Data

US 2023/0152430 A1 May 18, 2023

(51) Int. Cl.
*G01S 7/495* (2006.01)
*G01S 17/66* (2006.01)

(52) U.S. Cl.
CPC .............. *G01S 7/495* (2013.01); *G01S 17/66* (2013.01)

(58) Field of Classification Search
CPC .............. F41H 13/0043; F41H 13/005; F41H 13/0062; F41H 13/0093
See application file for complete search history.

(56) References Cited

U.S. PATENT DOCUMENTS

| | | | |
|---|---|---|---|
| 10,342,111 B2 * | 7/2019 | Nishikata | F41H 13/0093 |
| 10,508,889 B1 * | 12/2019 | Lynn | F41H 13/005 |
| 10,690,456 B1 * | 6/2020 | Bitar | F41H 13/0043 |
| 10,935,642 B2 * | 3/2021 | Blanchard | G01S 7/495 |
| 11,181,347 B2 * | 11/2021 | Nishikata | F41H 13/005 |
| 2003/0233931 A1 * | 12/2003 | Nemtsev | F41H 13/0062 89/1.11 |
| 2016/0097616 A1 * | 4/2016 | Weigold | F41H 13/0062 250/396 R |

FOREIGN PATENT DOCUMENTS

EP 3163320 A1 * 5/2017 ............ G01S 17/66

* cited by examiner

*Primary Examiner* — Bernarr E Gregory
(74) *Attorney, Agent, or Firm* — Naval Information Warfare Center Pacific; Kyle Eppele; J. Eric Anderson (57) ABSTRACT

A method for jamming a target includes aiming a pulsed laser at the target using a tracking system. The pulsed laser emits a pulsed laser beam at the target, thereby generating plasma that causes sound waves equal to or less than 5 ft from the target. The pulsed laser beam is swept with a frequency range to find a target frequency, thereby jamming the target.

18 Claims, 7 Drawing Sheets

TARGET JAMMING

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

BACKGROUND

An electronic countermeasure (e.g., jamming) involves using a device to block, disrupt, or deceive other electronic systems, such as radar, sonar, or many other electronic systems. In particular, for jamming, an interfering signal is radiated that blocks or disrupts the electronic device being jammed. Jamming can be used offensively or defensively depending on the situation. Similarly, the specific technique used to jam an electronic device depends on the type of electronic device being jammed and the mode of operation for the electronic device. Some examples of jamming techniques include spot jamming, sweep jamming, barrage jamming, base jamming etc.

DESCRIPTION OF THE DRAWINGS

Features and advantages of examples of the present disclosure will be apparent by reference to the following detailed description and drawings, in which like reference numerals correspond to similar, but in some instances, not identical, components. Reference numerals or features having a previously described function may or may not be described in connection with other drawings in which they appear.

DETAILED DESCRIPTION

Defending against various electronic threats has been accomplished with multiple methods. In traditional methods, weapons can be used to destroy the electronic threat, such as a missile being used to destroy a drone. In another method, emitters are used to jam radio frequencies (RF) that the electronic devices are using to function or the electronic devices are using to communicate with other devices that control the electronic device. For smaller electronic threats, such as drones, physical shockwaves have been created from lasers to disrupt a drone flight path. However, all of these methods are either ineffective or costly to use.

In the method herein, a method is disclosed to jam micro electromechanical systems (MEMS) or MEMS-like devices (e.g., vibration based sensors) remotely using an amplitude-modulated laser or pulsed laser. The pulsed laser is aimed at a target, such as a drone, and sweeps through a frequency range until the target with the MEMS device is disrupted. Once the target is disrupted, the target frequency is known and the pulsed laser is set at the same frequency as the target frequency to disrupt or destroy the MEMS device. This method is cheaper and more efficient than traditional methods (e.g., weapons) or using RF emitters because the equipment is cheap and there is an unlimited amount of ammunition. Furthermore, unlike methods that use lasers to create physical shockwaves, the method herein functions when the laser is aimed within 5 ft of the target to disrupt or destroy the target. In contrast, a method that creates physical shockwaves would need to be within the pathway of the target to have any impact at all. Therefore, the method herein is cheaper and more effective than known methods for disrupting or destroying MEMS or MEMS-like devices.

A method for jamming a target includes aiming a pulsed laser at the target using a tracking system. The pulsed laser emits a pulsed laser beam at the target, thereby generating plasma that causes sound waves equal to or less than 5 ft from the target. The pulsed laser beam is swept through a frequency range to find a target frequency, thereby jamming the target.

Figure 1:
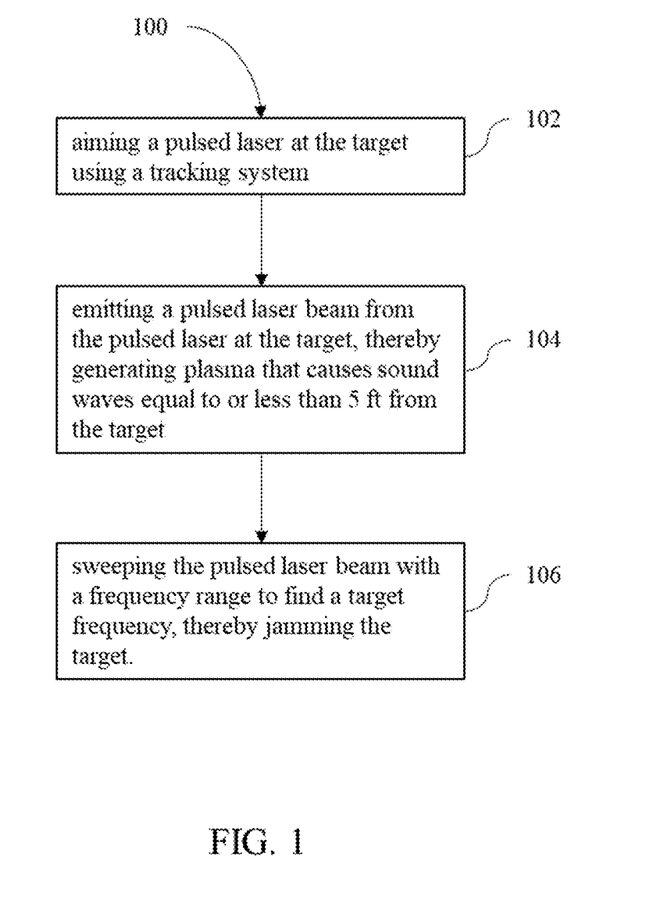
FIG. 1 is a flow diagram illustrating an example of the target jamming method disclosed herein.

Referring now to FIG. 1, the method 100 includes aiming a pulsed laser at the target using a tracking system 102. The pulsed laser may be any pulsed laser or amplitude-modulated laser. In another example, the laser is a low repetition rate laser. For example, a YAG 1064 nm laser. In some examples, the pulsed laser may be aimed at a stationary target. If the pulsed laser is aiming at a stationary target, the tracking system may or may not be used depending on the application. If the tracking system is not used, the pulsed laser is manually aimed at the stationary target by a user. When the tracking system is used, the tracking system finds and follows the target and aims the pulsed laser at the target when the target moves. In addition, the tracking system needs to aim the pulsed laser equal to or less than 5 ft from the target. The pulsed laser does not need to be aimed directly at the target, but the pulsed laser can hit the target directly or be within 5 ft of the target.

The tracking system may be any tracking system that can aim the pulsed laser at a stationary or moving target. Some examples include traditional tracking systems, such as radar. Other examples include short range tracking systems, such as motion tracking systems. In other examples, other tracking systems may be used, such as a laser tracking system or Lidar. In yet another example, known automatic visual tracking systems may be used to track a target and aim the pulsed laser, such as any image tracking systems.

The target may be any device, system, or object that uses vibration based sensors. Some examples include any device, system, or object that uses MEMS or a MEMS-like device. Some examples of stationary targets with MEMS include computers, disk drives, sensors, etc. Some examples of mobile targets with MEMS include remote controlled or autonomous vehicles, such as helicopters, planes, drones, and navigational systems of cars, airplanes, submarines, and other vehicles.

Referring back to FIG. 1, the method 100 includes emitting a pulsed laser beam from the pulsed laser at the target, thereby generating plasma that causes sound waves equal to or less than 5 ft from the target 104. In some examples, the pulsed laser beam has a repetition rate equal to or less than 100 kHz. In addition, the pulsed laser beam generates higher harmonic frequencies equal to or less than 100 kHz. The pulsed laser generates plasma that produces sound waves. The sound waves produced by the plasma are strong enough to disrupt a target equal to or less than 5 ft from where the laser beam is producing plasma.

Referring back to FIG. 1, the method 100 includes sweeping the pulsed laser through a frequency range to find a target frequency, thereby jamming the target 106. In an example, the pulsed laser is swept through a frequency range of equal to or less than 100 kHz to find the target frequency as previously stated herein. In another example, the harmonic frequencies are also swept to find the target frequency. For example, if the pulsed laser is at 10 kHz, the harmonic frequencies at 20 kHz, 30 kHz, etc. are also used to find the target frequency. In this example, the target is operating at a target frequency of equal to or less than 100 kHz. Sweeping the pulsed laser with a frequency range equal to or less than 100 kHz allows a user to determine what specific frequency the target is operating. The target frequency is determined when the target becomes disrupted by the pulsed laser beam during sweeping the frequency range. The specific frequency in the frequency range that causes disruption is the target frequency. Once the target frequency is determined, the pulsed laser is set to the same frequency as the target frequency to jam the target. In some examples, once the frequency is set to the same frequency as the target frequency, if the target is moving, the pulsed laser follows the target using the laser tracking system when the target moves, thereby continuing to jam the target. In one example, after finding and maintain the pulse laser beam equal to or less than 5 ft from the target, the laser beam is held equal to or less than 5 ft from the target for a time of equal to or less than 10 seconds.

In some other examples, the method 100 can further include two or more pulsed lasers that emit pulsed laser beams target, thereby generating plasma that causes sound waves equal to or less than 5 ft from the target. The additional pulsed lasers would be the same pulsed lasers as previously described herein. Each pulsed laser would use the same tracking system and operate under the same method 100 as previously disclosed herein.

In another example, a system for jamming a target is disclosed herein. The system includes a pulsed laser and a tracking system. The pulsed laser, tracking system, and target are the same pulsed laser, tracking system, and target as previously disclosed herein. In some examples, the system includes two or more pulsed lasers. When there are two or more pulsed lasers in the system, the pulsed lasers would be the same pulsed lasers as previously described herein. Each pulsed laser would use the same tracking system and operate under the same method 100 as previously disclosed herein.

To further illustrate the present disclosure, examples are given herein. These examples are provided for illustrative purposes and are not to be construed as limiting the scope of the present disclosure.

EXAMPLES

Example 1: Inertial Mass Unit (IMU) MEMS Measurements

Figure 2:
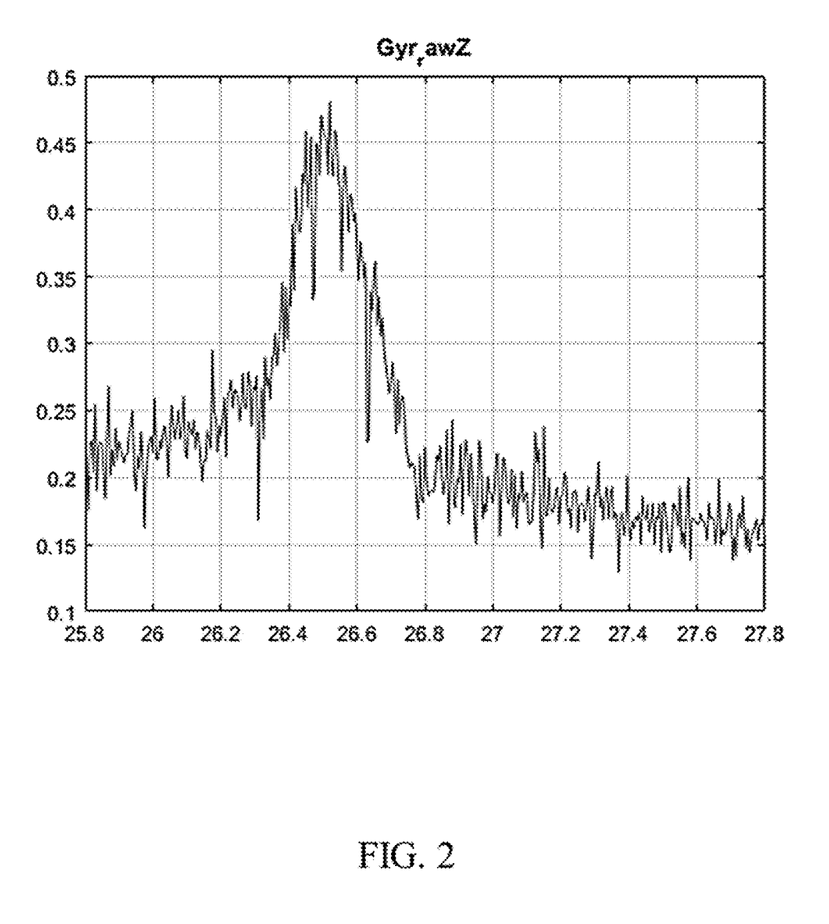
FIG. 2 is a plot of the laser frequency (X-axis, kHz) vs. the IMU (inertial measurement unit) response (Y-axis, voltage)

Ubiquitous inertial mass unit (IMU) devices were tested that use MEMS to measure orientation (i.e., MEMS accelerometer and MEMS gyroscope). A speaker was set up about 2 inches away from the IMU and scanned for the frequency. The acoustic spectral response is shown in FIG. 2 for one of the axes of the gyroscope. FIG. 2 shows that this particular MEMS device resonates at around 26.5 kHz. As this IMU is sensing the environment, when the external force exerts a signal at 26.5 kHz, the sensor will record amplified data swings (i.e., false data). This causes a disruption that may cause the MEMS system to attempt to self-correct. Depending on what the MEMS device is being used in, this could cause the device to be destroyed by inaccurately self-correcting.

Example 2: IMU MEMS Response to Laser Pulsing

Figure 3A:
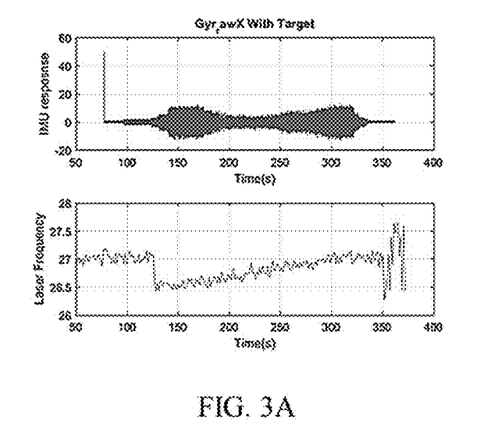
FIG. 3A-3C are figures of two plots showing Time (s) (X-axis, labeled "Time (s)") vs. IMU response (Y-axis, voltage labeled "IMU response") and Time (s) (X-axis, labeled "Time (s)") vs. Laser Frequency (Y-axis, voltage labeled "Laser Frequency"), respectively.
Figure 3B:
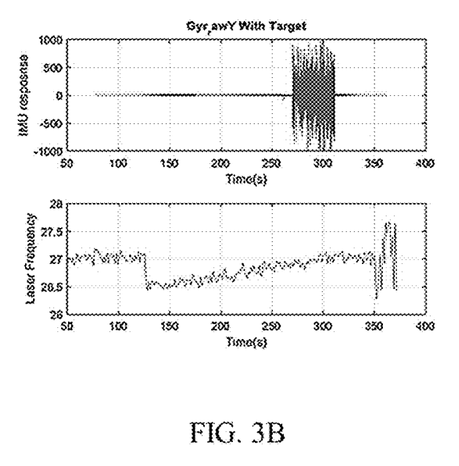
Figure 3C:
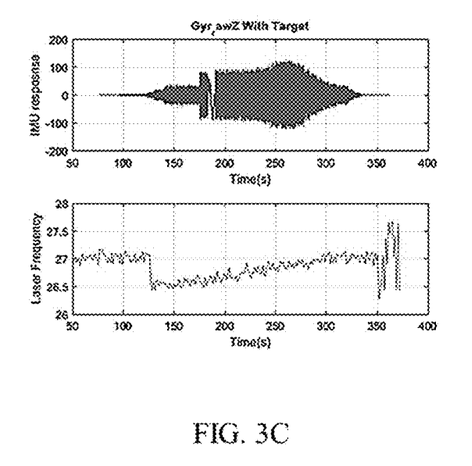

In this example, a laser was swept with laser repetition rate ranging from about 980 Hz to about 1000 HZ, which provides a harmonic frequency up to 26.5 kHz. The data was recorded by a high frequency microphone that is synchronized with the IMU. As shown in Example 1, the MEMS device has a resonant acoustic frequency at 26.5 kHz. Therefore, the laser was tuned to induce plasma generated acoustics that overlap with a frequency of 26.5 kHz to jam and influence the MEMS sensor output. FIG. 3A-3C show the result of this experiment on the 3 axes of the gyroscope, the x-axis, y-axis, and z-axis, for FIG. 3A, 3B, and 3C, respectively.

FIG. 3A-3C above shows the three gyro data from the IMU based on MEMS sensor when the laser induced plasma-generated acoustics. There are two plots for each FIG. 3A-3C. The plot on the top of each FIG. 3A-3C is the raw signal for the gyro as a function of time. The plot on the bottom of each FIG. 3A-3C is the acoustic frequency generated by the laser as a function of time. The laser acoustic was initially set to a repetition rate of 1 kHz, which had little to no effect (indicated by the flat line from time 50 s to about 125 s). The repetition rate of 1 kHz generates a harmonic frequency of 27 kHz, which is labeled on the left hand axis of the bottom plots of each set. In all three sets, the gyro data is stable at 27 kHz. This is because the laser is not generating enough plasma-induced sound waves to jam the MEMS device. As the laser was swept to the repetition rate of 980 Hz to 1000 Hz, which has harmonics at 26.46 kHz to 27 kHz, the gyro recorded data that would indicate a significant amount of movement even though the gyro was not moving.

Figure 4A:
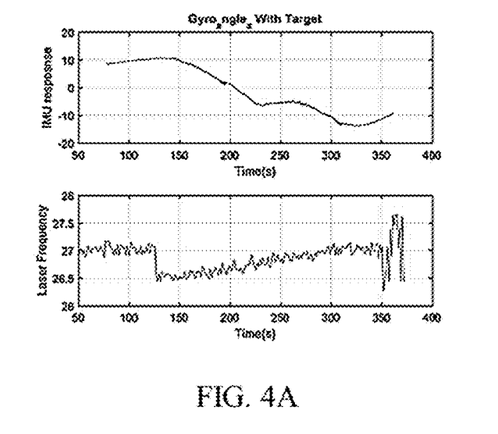
FIG. 4A-4C are additional figures of two plots showing Time (s) (X-axis, labeled "Time (s)") vs. IMU response (Y-axis, voltage labeled "IMU response") and Time (s) (X-axis, labeled "Time (s)") vs. Laser Frequency (Y-axis, voltage labeled "Laser Frequency"), respectively.
Figure 4B:
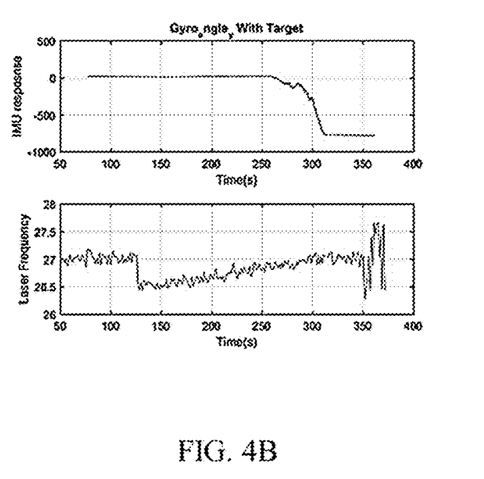
Figure 4C:
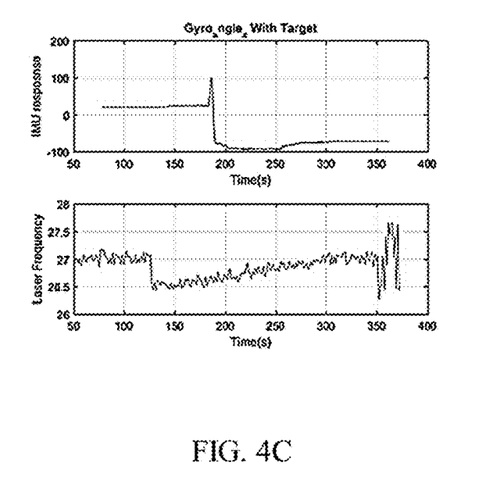

There are two plots for each FIG. 4A-4C. The top plots show the computed angles from the raw gyro data. The plot on the bottom of each FIG. 4A-4C is the same acoustic frequency generated by the laser as a function of time. FIG. 4A-4C show significant false movement induced by the laser induced plasma-generated acoustics. This data indicates successful remote jamming of MEMS devices.

Example 3: Drone Jamming

In this example, an IMU was attached to a plastic box. An aluminum target was mounted on the plastic box to measure the effects of surface laser induced plasma on angle Arduino state computation. The plastic box was then mounted on a linear stage to move the target left and right. The purpose of this motion is to prolong the laser exposure such that when the plasma is generated on the surface of the plastic there is more target to hit.

Figure 5A:
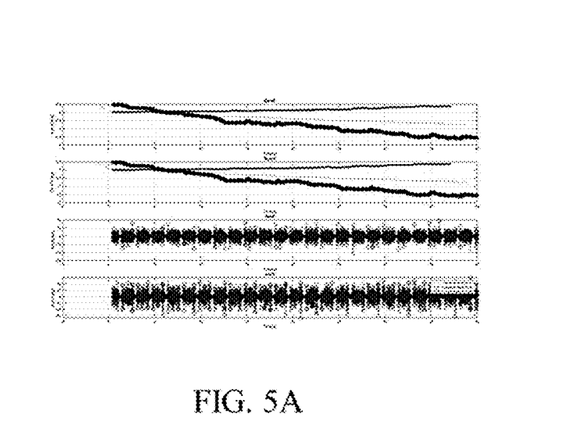
FIG. 5A-C are four plots each that include Time (X-axis, labeled "Time (s)") vs. the gyro movement in the x-axis (Y-axis, labeled "GyroX,(deg)"), gyro movement in the y-axis (Y-axis, labeled "GyroY,(deg)"), accelerometer movement in the x-axis (Y-axis, labeled "AccX,(deg)"), and accelerometer movement in the y-axis (Y-axis, labeled "AccY,(deg)"), respectively.
Figure 5B:
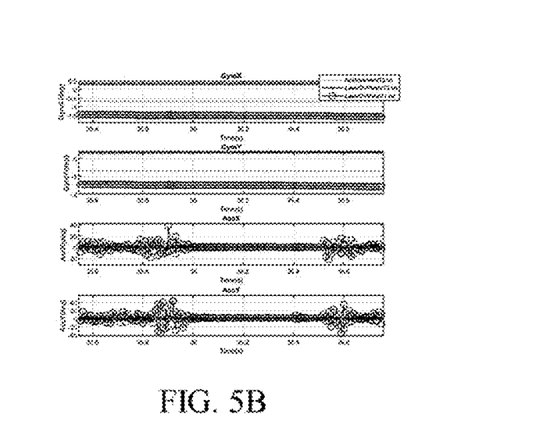
Figure 5C:
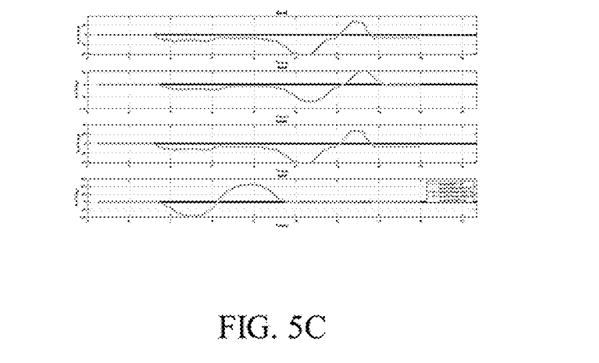

The IMU stabilization loop consist of two axis, x and y. The IMU has two sensors for this measurement, a gyro and an accelerometer. FIG. 5A-5C shows the data of the angle measured by the IMU. When the plastic side was exposed to the laser induced plasma, the change of angle induced to the gyro sensor is about twice as much in comparison to the aluminum target. Since the target was encased in the plastic, the angle that was induced is negative. On the other hand, the accelerometer data shows a change of 25° induced noise when the laser induced plasma hits the aluminum side, but very small effect on the plastic side.

Example 4: Single Axis Drone Jamming

Figure 6:
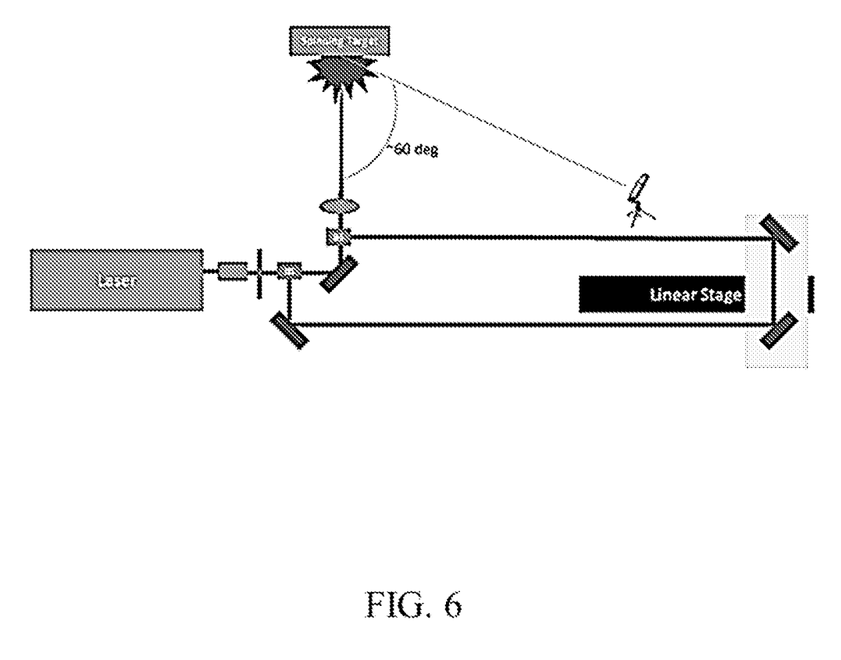
FIG. 6 is a diagram showing the experimental setup for an example of the method disclosed herein.
Figure 7A:
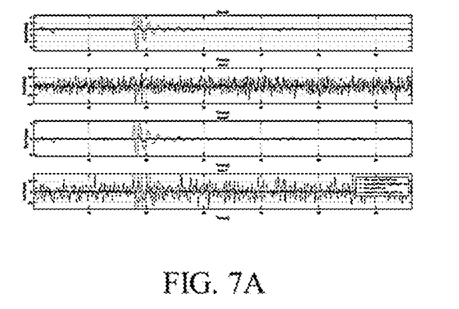
FIG. 7A-7C are four plots each that include Time (X-axis, labeled "Time (s)") vs. the gyro movement in the x-axis (Y-axis, labeled "GyroX,(deg)"), gyro movement in the y-axis (Y-axis, labeled "GyroY,(deg)"), accelerometer movement in the x-axis (Y-axis, labeled "AccX,(deg)"), and accelerometer movement in the y-axis (Y-axis, labeled "AccY,(deg)"), respectively.
Figure 7B:
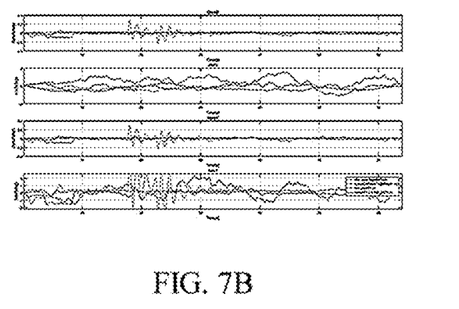
Figure 7C:
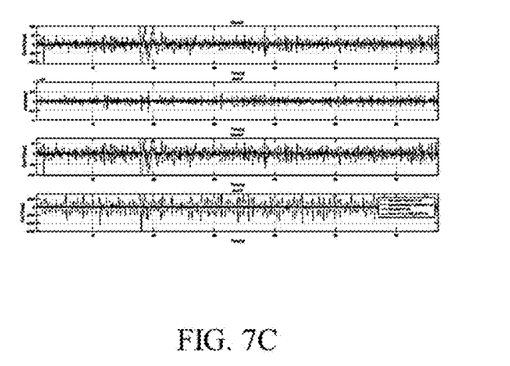

In this example, the correct PID constant loop was configured to balance the dual propeller. A plastic backed with aluminum sheet was attached to prevent the laser from burning a hole through the box to prevent damaging the electronics. The experimental setup is shown in the diagram shown in FIG. 6. The data was taken from the IMU via Arduino. The results are shown in FIG. 7A-7C. The three data for each FIG. 7A-7C includes "no laser", "no laser, tapped at 15 s", "laser hitting the metal", and "laser hitting the plastic".

In the data shown in FIG. 7A-7C, the stabilized angle data shows that the IMU is stable. When the drone was tapped at 15 seconds, FIG. 7B and 7C show spiking as well as feedback and correction for the tapping. The y-axis accelerometer data in FIG. 7B shows oscillation at the rate of the laser exposure. The laser is physically blocked by the linear stage (shown in FIG. 6) at about 3 seconds.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of a list should be construed as a de facto equivalent of any other member of the same list merely based on their presentation in a common group without indications to the contrary.

Unless otherwise stated, any feature described herein can be combined with any aspect or any other feature described herein.

Reference throughout the specification to "one example", "another example", "an example", means that a particular element (e.g., feature, structure, and/or characteristic) described in connection with the example is included in at least one example described herein, and may or may not be present in other examples. In addition, the described elements for any example may be combined in any suitable manner in the various examples unless the context clearly dictates otherwise.

The ranges provided herein include the stated range and any value or sub-range within the stated range. For example, a range from about 800 Hz to about 1000 Hz should be interpreted to include not only the explicitly recited limits of from about 800 Hz to about 1000 Hz, but also to include individual values, such as 875 Hz, 900 Hz, 950 Hz, etc., and sub-ranges, such as from about 850 Hz to about 950 Hz, etc.

In describing and claiming the examples disclosed herein, the singular forms "a", "an", and "the" include plural referents unless the context clearly dictates otherwise.

What is claimed is:

1. A method for jamming a target, comprising:
   aiming a pulsed laser directly at, or up to 5 ft from, the target using a tracking system;
   emitting a pulsed laser beam from the pulsed laser, wherein the pulsed laser beam generates plasma that causes sound waves; and
   finding, by sweeping the pulsed laser through a frequency range, a target frequency where the sound waves generated by the pulsed laser beam disrupt a micro electromechanical system of the target.

2. The method of claim 1, further including following the target with the pulsed laser using a laser tracking system when the target moves.

3. The method of claim 1, wherein the target is any device, system, or object containing a micro electromagnetic system or a vibration based sensor.

4. The method of claim 1, further comprising setting the pulsed laser to the same frequency as the target frequency after sweeping the pulsed laser beam to find the target frequency.

5. The method of claim 1, wherein the target frequency lies within a range of 0 to 100 kHz.

6. The method of claim 1, further including emitting pulsed laser beams from two or more pulsed lasers, wherein each pulsed laser beam is capable of generating plasma that causes sound waves capable of reaching the target from up to 5 ft from the target.

7. The method of claim 1, wherein the pulsed laser generates the pulsed laser beam up to 5 ft from the target for a time of up to 10 seconds.

8. The method of claim 1, wherein the pulsed laser is swept through the frequency range of 0 to 100 kHz.

9. A system for jamming a target, comprising:
   a pulsed laser, wherein the pulsed laser emits a pulsed laser beam that generates plasma causing sound waves capable of reaching the target from up to 5 ft away from the target;
   wherein when the pulsed laser beam is emitted at a target frequency the sound waves generated by the pulsed laser beam disrupt a micro electromechanical system of the target, thereby jamming the target; and
   a tracking system configured to aim the pulsed laser directly at, or up to 5 ft away from, the target.

10. The system of claim 9, wherein the tracking system is further configured to keep the pulsed laser beam aimed directly at, or up to 5 ft away from, when the target moves, thereby continuing to jam the target.

11. The system of claim 9, wherein the target is any device, system, or object containing a micro electromagnetic system or a vibration based sensor.

12. The system of claim 9, wherein the pulsed laser is configured to sweep the pulsed laser beam through a range of frequencies to find a target frequency of the target where the sound waves generated by the pulsed laser beam disrupt the micro electromechanical system of the target.

13. The system of claim 12, wherein the pulsed laser beam is set to have the same frequency as the target frequency of the target after sweeping the pulsed laser beam to find the target frequency.

14. The system of claim 9, wherein the target operates at the target frequency up to 100 kHz.

15. The system of claim 9, wherein the target is a mobile target.

16. The system of claim 9 further including two or more pulsed lasers, wherein each pulsed laser is capable of emitting pulsed laser beams directly at, or up to 5 ft away from, the target, thereby generating plasma that causes sound waves on or up to 5 ft away from the target.

17. The system of claim 9, wherein the pulsed laser generates the pulsed laser beam up to 5 ft from the target for a time of up to 10 seconds.

18. The system of claim 9, wherein the pulsed laser emits a pulsed laser beam at the target with a frequency range of up to 100 kHz.

\* \* \* \* \*